US007107430B2

(12) United States Patent
Grossman et al.

(10) Patent No.: US 7,107,430 B2
(45) Date of Patent: Sep. 12, 2006

(54) MECHANISM TO REDUCE THE COST OF FORWARDING POINTER ALIASING

(75) Inventors: Jeffrey P. Grossman, Cambridge, MA (US); Thomas F. Knight, Jr., Belmont, MA (US); Jeremy H. Brown, Somerville, MA (US); Andrew W Huang, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 511 days.

(21) Appl. No.: 09/990,798

(22) Filed: Nov. 14, 2001

(65) Prior Publication Data

US 2003/0005256 A1 Jan. 2, 2003

Related U.S. Application Data

(60) Provisional application No. 60/299,244, filed on Jun. 19, 2001.

(51) Int. Cl.
*G06F 12/00* (2006.01)

(52) U.S. Cl. .................. 711/202; 711/216; 711/220; 707/1; 707/206; 707/205; 707/200; 707/101; 707/10

(58) Field of Classification Search ............. 711/202, 711/216, 220; 707/1, 206, 205, 200, 101, 707/10
See application file for complete search history.

(56) References Cited

U.S. PATENT DOCUMENTS 5,025,253 A * 6/1991 DiLullo et al. .......... 340/10.41
5,325,524 A * 6/1994 Black et al. ................ 707/10
5,845,331 A 12/1998 Carter et al. .............. 711/163
5,900,001 A * 5/1999 Wolczko et al. ........... 707/206
5,933,820 A * 8/1999 Beier et al. .................. 707/1

(Continued)

FOREIGN PATENT DOCUMENTS

JP 934823 * 9/1997

OTHER PUBLICATIONS

Moss, J. E. B., "Design of the Mneme Persistent Object Store", *ACM Transactions on Information Systems*, 8 (2) :103-139 (1990).

(Continued)

*Primary Examiner*—Kimberly N. McLean-Mayo
(74) *Attorney, Agent, or Firm*—Hamilton, Brook, Smith & Reynolds, P.C.

(57) ABSTRACT

Short-quasi-unique-identifiers (SQUIDs) are generated and assigned to the data objects stored in memory. Pointers to a particular data object contain the data object's assigned SQUID. If a data object is moved to a second allocated memory segment, a new pointer to the second allocated memory segment is placed at the original memory segment, so that any pointers to the original memory segment now point to the new pointer. The distribution of SQUIDs is uniform. SQUIDs can be generated by counting, generated randomly, generating through some hashing mechanism, or other means. In comparing two different pointers, it is determined that the two pointers do not reference the same data object if the SQUIDs are different. On the other hand, if the SQUIDs are identical and the address fields of the two pointers are identical, then the two pointers reference the same data object. In addition, a pointer is associated with a migration indicator field which indicates the number of migrations of the referenced data object prior to the pointer being created. The comparator determines that two pointers do not reference the same data object if their associated migration indicators indicate identical numbers of migrations and their corresponding addresses are different.

60 Claims, 7 Drawing Sheets

U.S. PATENT DOCUMENTS

| | | | |
|---|---|---|---|
| 6,560,619 B1* | 5/2003 | Flood et al. | 707/206 |
| 2001/0027501 A1* | 10/2001 | O'Hare et al. | 710/107 |
| 2002/0175805 A9* | 11/2002 | Armstrong et al. | 340/10.31 |

OTHER PUBLICATIONS

Luk, C. K., and Mowry, T.C., "Memory Forwarding: Enabling Aggressive Layout Optimizations by Guaranteeing the Safety of Data Relocation," *Proc. ISCA '99*, pp. 88-99 (1999).

Day, M., et al., "References to Remote Mobile Objects in Thor", *ACM Letters on Programming Languages& Systems*, 2 (1-4) :115-126 (1993).

Carter, N. P., et al., "Hardware Support for Fast Capability-based Addressing", *Proc. 6th International Conference on Architectural Support for Programming Languages and Operating Systems*, (1994).

\* cited by examiner

2A
Before Moving

2B
After Moving

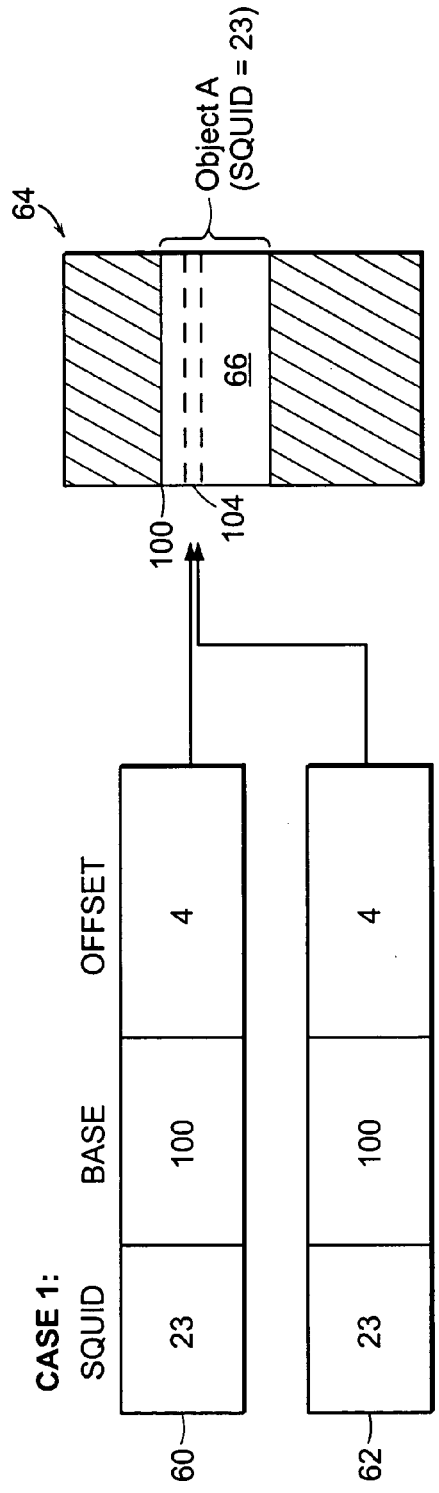
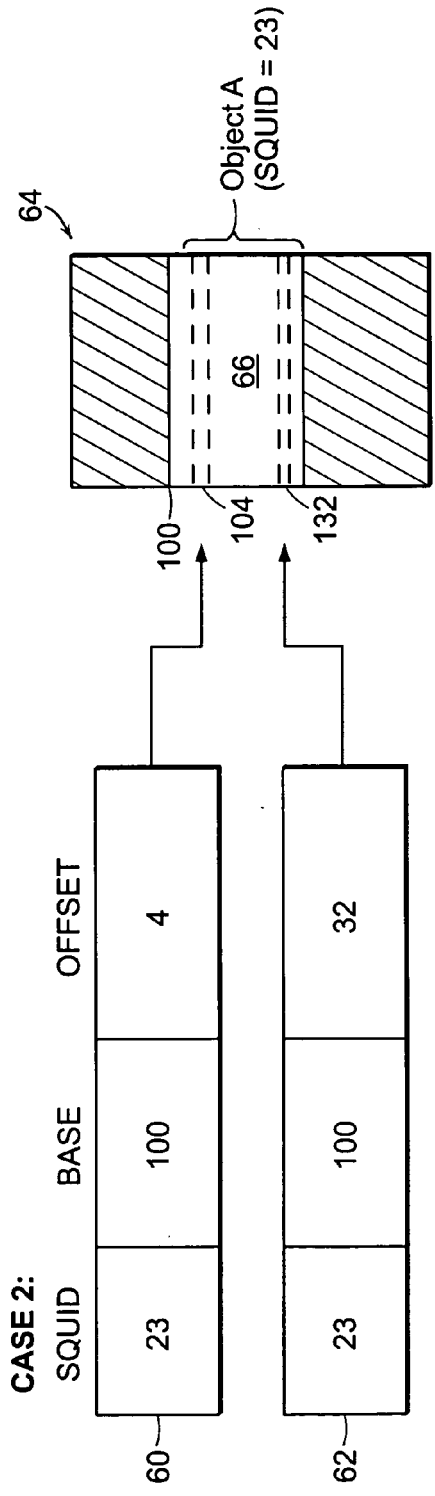
FIG. 4A
FIG. 4B

MECHANISM TO REDUCE THE COST OF FORWARDING POINTER ALIASING

RELATED APPLICATION

This application claims the benefit of U.S. Provisional Application No. 60/299,244, filed on Jun. 19, 2001.

The entire teachings of the above application are incorporated herein by reference.

GOVERNMENT SUPPORT

The invention was supported, in whole or in part, by a grant F30602-98-1-0172 from Air Force Research Lab. The Government has certain rights in the invention.

BACKGROUND OF THE INVENTION

Forwarding pointers are an architectural mechanism that allow references to a memory location to be transparently forwarded to another location. Known variously as "invisible pointers," "forwarding pointers" and "memory forwarding," they are familiar to the hardware community but to date have been incorporated into very few architectures.

One reason that forwarding pointers have received little support is that they have been perceived as possessing limited utility. Recently, however, it has become apparent that forwarding pointers are indeed useful constructs that can expedite program execution. Chi-Keung Luk and Todd C. Mowry, "Memory Forwarding: Enabling Aggressive Layout Optimizations by Guaranteeing the Safety of Data Relocation," Proc. ISCA 1999, pp. 88–99 (hereafter "Luk"), incorporated by reference herein in its entirety, show that using forwarding pointers to perform safe data relocation can result in significant performance gains on arbitrary programs written in C, speeding up some applications by more than a factor of two. Jeremy Brown, "Memory Management on a Massively Parallel Capability Architecture", Ph.D. thesis proposal, M.I.T., December 1999, gives an algorithm for performing asynchronous local compacting garbage collection in a massively parallel distributed system. This algorithm uses forwarding pointers to avoid the high run-time costs usually associated with such a system. Thus, there is growing motivation to include hardware support for forwarding pointers in novel architectures.

A second and perhaps more significant reason that forwarding pointers have received little attention from hardware designers is that they introduce aliasing—that is, it is possible for two different pointers to resolve to the same word in memory.

FIG. 1A illustrates how aliasing occurs. A first pointer $P_2$ 14 points directly to some target data 16. A second, indirect pointer, $P_1$ 10 points to a forwarding pointer 12 which in turn points to the target data 16. Thus, pointers $P_1$ and $P_2$, which hold different values, resolve to the same target data 16.

FIGS. 1B and 1C illustrate one manner in which such a scenario can occur. Here, two data objects A 4 and D 16 are stored in a memory 2A (FIG. 1B), with a pointer $P_1$ 10 directly referencing data object D 16. As a result of data compaction or other operations, data object D 16 is moved, as shown in memory 2B (FIG. 1C), and a new forwarding pointer 12 is inserted into data object D's old location. Thus pointer $P_1$ 10 now points to the forwarding pointer 12 which points to the new location of data object D 16. Pointer $P_1$ 10 is therefore now an indirect pointer. Meanwhile, a new direct pointer $P_2$ 14 has been created which points to the new location of data object 16, resulting in the combination of pointers pictured in FIG. 1A.

The presence of this aliasing necessarily introduces run time costs in order to ensure correctness of execution. In Luk, two specific problems are identified. First, direct pointer comparisons are no longer a safe operation; some mechanism must be provided for determining the final addresses of the pointers. Second, seemingly independent memory operations may no longer be reordered in out-of-order machines.

In Luk, the problem of pointer comparisons is addressed by inserting code to determine the final address for each pointer, unless the compiler is able to determine that the pointers do not point to relocated objects. The overhead of this approach is potentially large.

In the best case, both target memory words will be resident in the cache, neither of them will contain a forwarding pointer, and the pointer comparison will be slowed down by roughly an order of magnitude. However, since pointer comparisons often precede a decision to perform operations on an object, a common case will be when one or both dereferences cause a cache miss, slowing down the comparison by another order of magnitude.

The solution proposed by Luk for reordering memory operations is to use "data dependence speculation," which allows loads to execute speculatively before it is known that they are independent of any preceding stores. In an architecture that supports data dependence speculation, it is fairly easy to extend the hardware to operate correctly in the presence of forwarding pointers. Luk found that this solution is effective as incorrect speculation occurs only rarely. However, Luk assumes the presence of some fairly complex hardware. For architectures in which silicon area efficiency is a concern, a lower cost alternative is preferable.

The forwarding pointer aliasing problem is an instance of the more general challenge of determining object identity in the presence of multiple and/or changing names. This problem has been studied explicitly. See, for example, Setrag N. Khoshafian, George P. Copeland, "Object Identity", Proc. 1986 ACM Conference on Object Oriented Programming Systems, Languages and Applications, pp. 406–416, incorporated by reference herein in its entirety.

A natural solution which has appeared time and again is the use of system-wide unique object IDs or UIDs. UIDs completely solve the aliasing problem, but have two disadvantages.

First, the use of UIDs to reference objects requires an expensive translation each time an object is referenced to obtain the virtual address of the object.

Second, quite a few bits are required to ensure that there are enough UIDs for all objects and that globally unique IDs can be easily generated in a distributed computing environment. In a large system, at least sixty-four bits would likely be required in order to avoid any expensive garbage collection of UIDs and to allow each processor to allocate UIDs independently.

SUMMARY OF THE INVENTION

In the worst case, one of the pointers points to data which is not even resident in main memory. This can occur frequently in programs that deal with massive datasets. It is desirable to be able to compare pointers without having to dereference them. By using short quasi-unique identifiers (SQUIDs), it is possible to do so in the majority of cases.

SQUIDs maintain one of the advantages of UIDs, namely they allow pointers to different objects to be distinguished quickly, and with high probability. Because SQUIDs are not unique, they can be much shorter than UIDs, comprising only a small number of bits, while still providing similar functionality. Furthermore, SQUIDs do not require any translation tables, since they are a part of the pointer format.

Therefore, in accordance with one aspect of the present invention, a data processing system comprises memory for storing data objects, where the data objects are referenced by pointers. A short-quasi-unique-identifier (SQUID) generator generates and assigns SQUIDs to data objects stored in the memory segment. Pointers to a particular data object contain the data object's assigned SQUID.

The system further comprises a memory allocator which allocates a segment of the memory to a data object. If the data object is moved to a second allocated memory segment, for example, due to resizing, data compaction or garbage collection, a new pointer to the second allocated memory segment is placed at the original memory segment, so that any pointers to the original memory segment now point to the new pointer. The data object might also be moved from a first memory to a second memory within a distributed system.

In at least one embodiment, the distribution of SQUIDs over a range is uniform. SQUIDs can be generated by counting, generated randomly, generating through some hashing mechanism, or other means.

Where two different pointers must be compared, a comparator compares their respective SQUIDs. The comparator determines that the two pointers do not reference the same data object if the SQUIDs are different. On the other hand, the comparator determines that the two pointers reference the same data object if the SQUIDs are identical and the address fields of the two pointers are identical.

In at least one embodiment, each pointer address field comprises a base address and an offset, and the comparator determines that the two pointers do not reference identical locations within a referenced data object if the pointers' offsets are not identical.

SQUIDs can be implemented either in hardware, or software, or a combination.

According to another aspect of the invention, a pointer is associated with a migration indicator field which indicates the number of migrations of the referenced data object prior to the pointer being created. The comparator determines that two pointers do not reference the same data object if their associated migration indicators indicate identical numbers of migrations and their corresponding addresses are different. The migration indicator can comprise just one bit, or may comprise multiple bits.

In at least one embodiment of the present invention, pointers are guarded pointers.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 4A–4E are schematic diagrams illustrating the different scenarios described in Table 1.

DETAILED DESCRIPTION OF THE INVENTION

A description of preferred embodiments of the invention follows.

The present invention is a simple mechanism which can be used to reduce the cost of forwarding pointer aliasing. Each object is assigned a short random tag, to be stored in each pointer to the object. This tag is similar in role to a unique identifier (UID), but is not necessarily unique. These tags are referred to as Short Quasi-Unique IDentifiers, or SQUIDs.

Figure 1A:
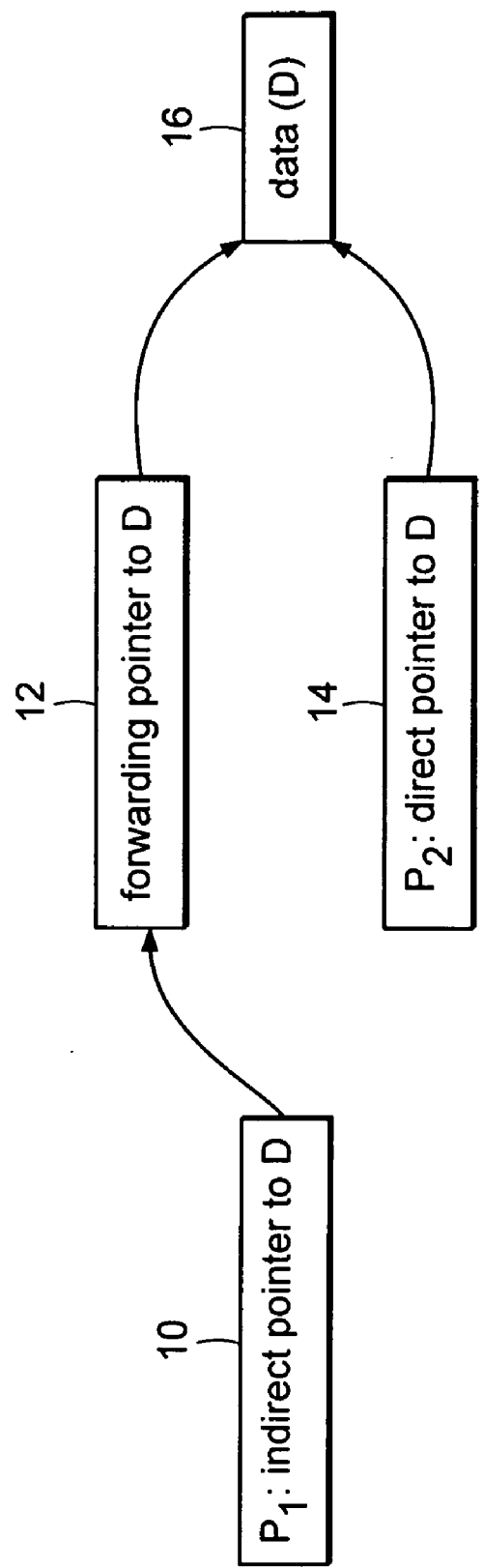
FIG. 1A is a schematic diagram illustrating the concept of forwarding pointer aliasing.
Figure 1B:
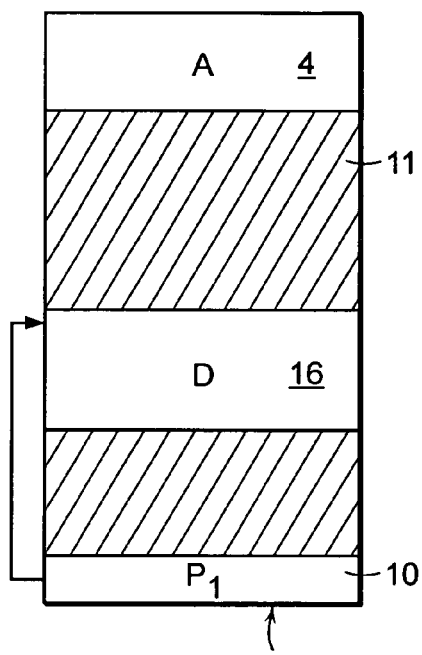
FIGS. 1B and 1C are schematic diagrams illustrating one manner in which the scenario of FIG. 1A can come about.
Figure 1C:
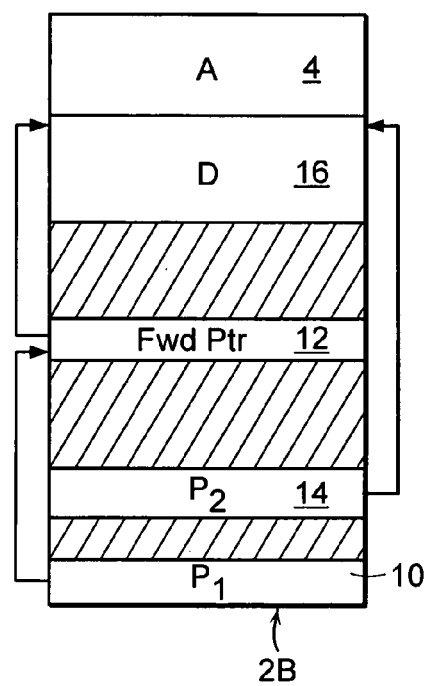
Figure 2:
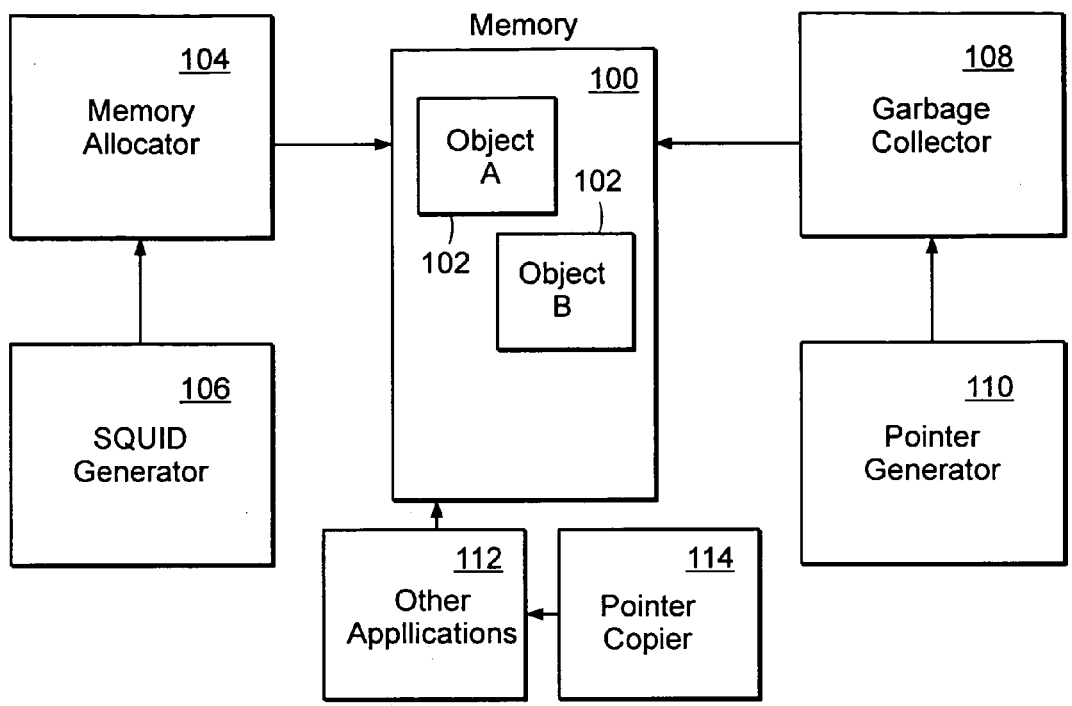
FIG. 2 is a block diagram of an embodiment of the present invention.

FIG. 2 illustrates an embodiment in which a memory 100 can hold many different data objects 102, two of which are shown. Unused memory space from the memory 100 is allocated to a new data object by a memory allocator 104 when the data object is first created. A SQUID is generated by a SQUID generator 106, and supplied to the memory allocator 104. The memory allocator 104 generates a pointer to the data object.

Thereafter, new pointers need by various applications 112 are generated by a pointer copier 114 that copies existing pointers. Since the SQUID is part of the pointer format, it is copied when an existing pointer is copied.

For example, when a device such as garbage collector 108 moves an object, it references the object through a pointer. When the object is moved, a forwarding pointer, pointing to the object's new location and generated for example by a pointer generator 110, is left at the old location. The SQUID from the referencing pointer is copied by the pointer generator 110 into the forwarding pointer.

In the common case, SQUIDs allow pointer comparison and memory operation reordering to proceed with no overhead. Only in rare cases is it necessary to degrade performance to ensure correctness. Thus, SQUIDs allow an architecture to support forwarding pointers with reduced average run-time overhead. Furthermore, this overhead can be eliminated altogether if the software chooses not to make use of forwarding pointers.

Figure 3:
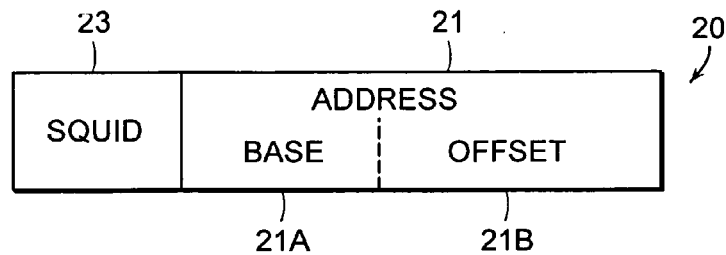
FIG. 3 is a schematic diagram illustrating a simple SQUID embodiment of the present invention.

As shown in FIG. 3, to implement SQUIDs, a pointer 20 according to the present invention comprises an address field 21 augmented with a short n-bit tag field 23, where n is, for example, from eight to sixteen bits in length. This tag field 23 is filled with a SQUID which is assigned a value when an object is allocated. Preferably, SQUIDs are assigned according to a uniform distribution over some range. Such assignment could be implemented, for example, by a simple counting function, randomly, or by a hashing function.

Unlike a UID, two pointers with the same SQUID might not point to the same object. However, two pointers with different SQUIDs necessarily point to different objects. In many cases this fact alone can be used to avoid the run-time costs of forwarding pointer aliasing.

Pointer Comparisons

An address is typically logically divided into a base 21A and an offset 21B. Two pointers can be efficiently compared by examining their base addresses, offsets and SQUIDs. Table 1 below illustrates the different possible scenarios.

In CASES 1 and 2, if the base addresses are the same, then the pointers point to the same object, and the pointers are the same if and only if they have the same offset into the object.

FIG. 4A illustrates CASE 1. Two pointers 60, 62 have identical SQUIDs, base addresses and offsets. Therefore, they both pont to the same data at address 104 in data object, Object A 66 within the memory 64.

FIG. 4B illustrates CASE 2, in which only the offsets of the two pointers 60, 62 are different. In this case, the pointers 60, 62 both point to the same object, Object A 66, but they point to different data, pointer 60 pointing to data located at address 104 and pointer 62 pointing to data located at address 132

Figure 4C:
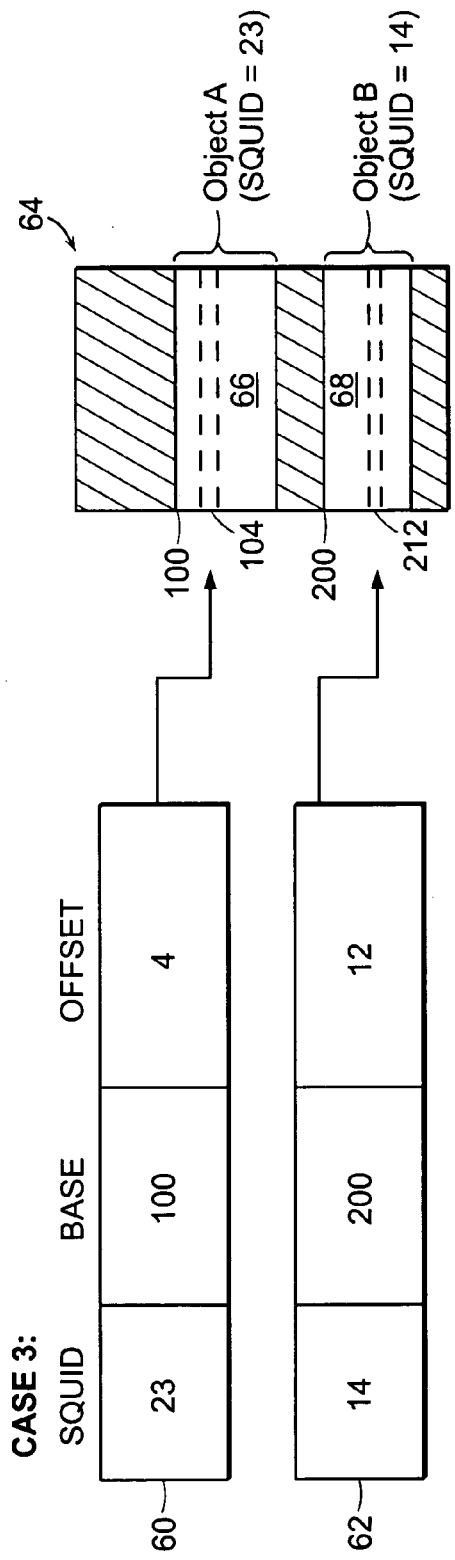

As FIG. 4C illustrates, if, as in CASE 3, the SQUIDs are different, then the pointers 60, 62 point to different objects, here shown as Object A 66 and Object B 68.

It is only in CASE 4, that is, in the case that the base addresses are different but the SQUIDs and offsets are the same, that it is necessary to perform expensive dereferencing operations to determine whether or not the final addresses are equal.

TABLE 1

|  | SQUIDS | BASES | OFFSETS | POINTERS |
|---|---|---|---|---|
| CASE 1 | SAME | SAME | SAME | SAME |
| CASE 2 | SAME | SAME | DIFF | Point to same object, but different offsets, so pointers are DIFFERENT |
| CASE 3 | DIFF | X | X | DIFFERENT |
| CASE 4 | SAME | DIFF | SAME | Must be resolved |

It can be argued that this latter case, i.e., CASE 4, will be rare. It occurs in two circumstances: either the pointers reference different objects which have the same SQUID, or the pointers reference the same object through different levels of indirection.

Figure 4D:
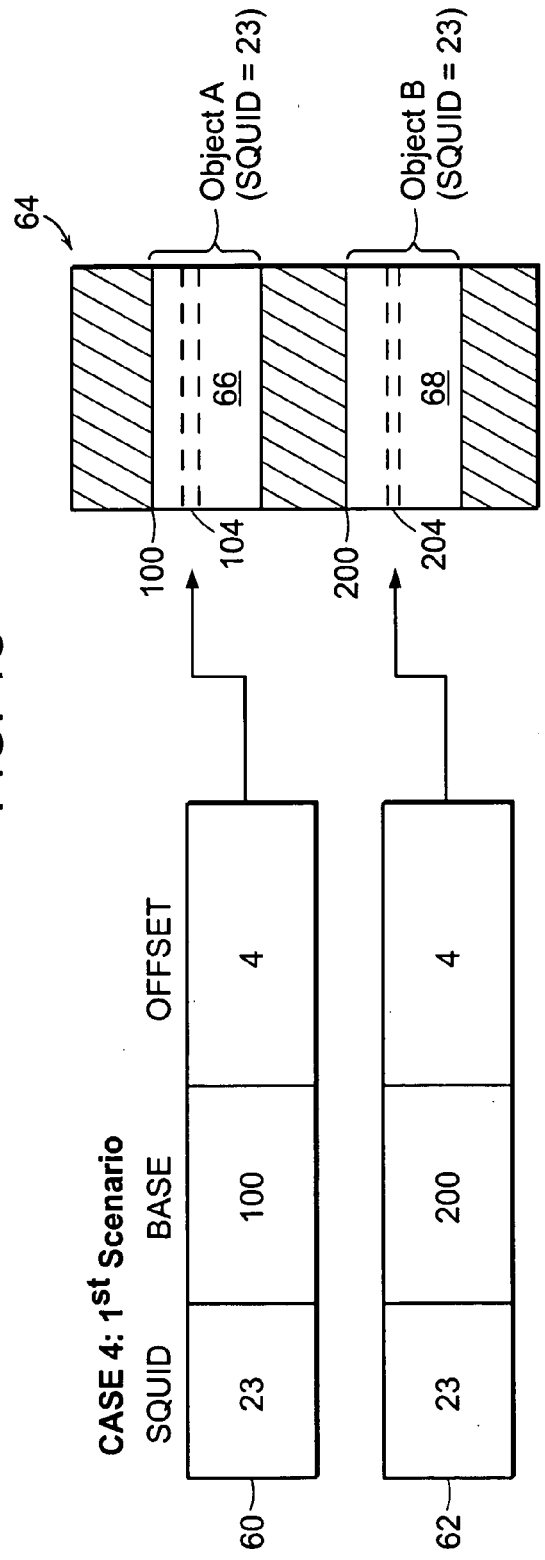

FIG. 4D illustrates a first scenario for CASE 4, in which the two pointer 60, 62 point to different objects, Object A 66 and Object B 68, whose SQUIDs have the same value, i.e., 23 in this example.

Figure 4E:
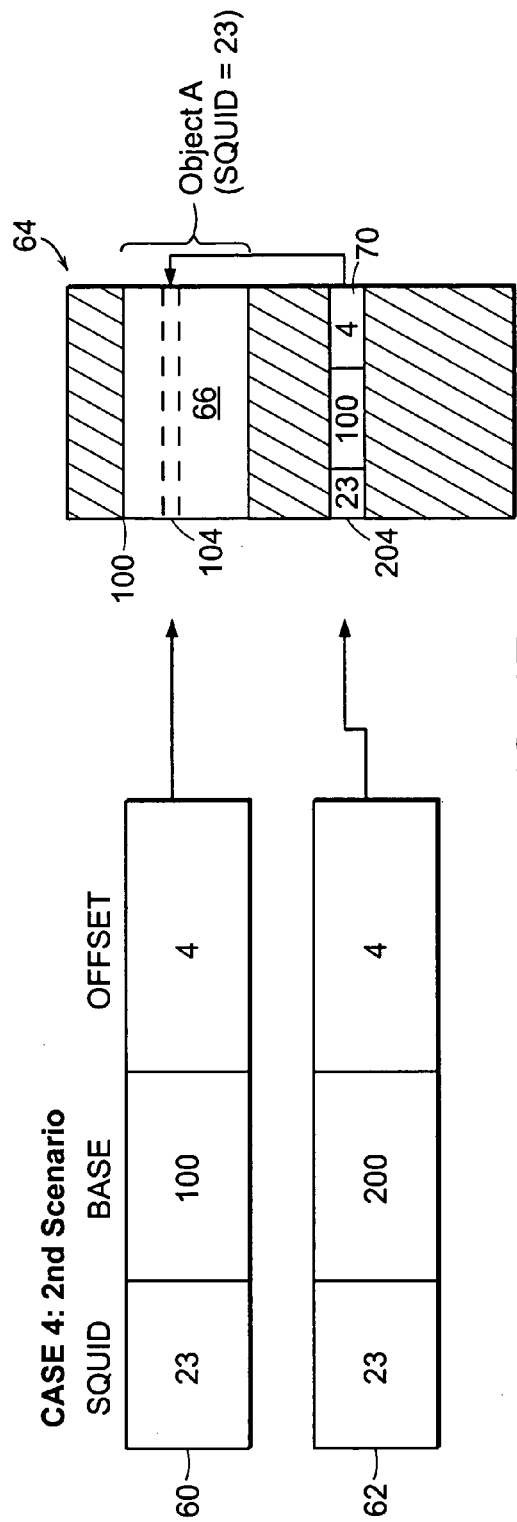

FIG. 4E illustrates the second scenario for CASE 4, in which the second pointer 62 indirectly points to the same object, i.e., Object A 66, as the first pointer 60, through a forwarding pointer 70.

The former scenario (FIG. 4D) occurs with probability $2^{-n}$. The latter scenario (FIG. 4E) is application dependent, but we note that (1) applications tend to compare pointers to different objects more frequently than they compare pointers to the same object, and (2) the results of the simulations in Luk indicate that it is reasonable to expect the majority of pointers to migrated data to be updated, so that two pointers to the same object will usually have the same level of indirection.

Reordering Memory Operations

Figure 5:
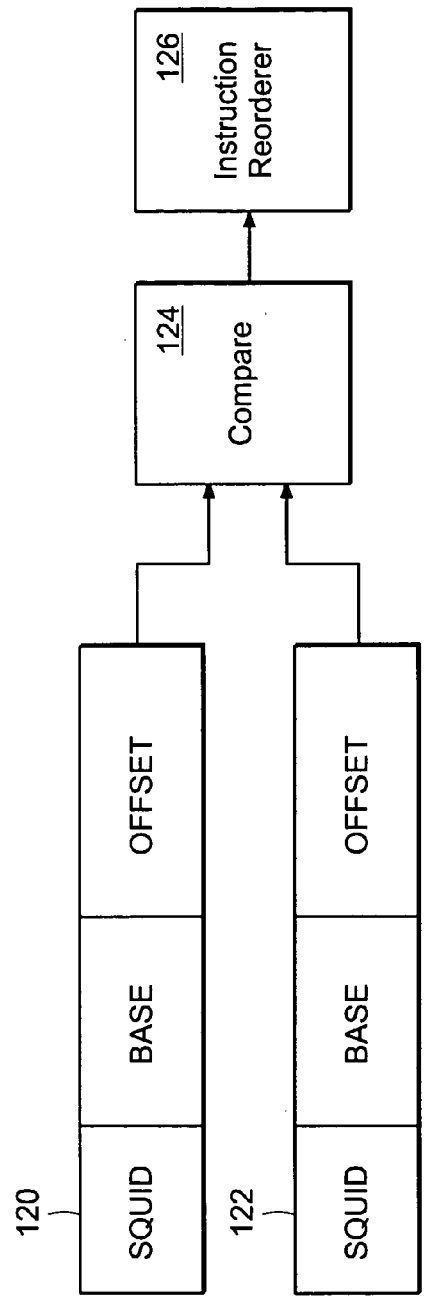
FIG. 5 is a schematic diagram illustrating how the invention can be used in deciding whether to reorder instructions.

As FIG. 5 illustrates, in a similar manner, a decision can be made, most likely by hardware, as to whether or not it is possible to reorder memory operations based on SQUIDs. Two pointers 120, 122 are compared by a comparator 124. An instruction reorderor 126 decides whether to reorder instructions based on the output of the comparator 124.

If the two pointers 120, 122 have different offsets or different SQUIDs then the corresponding operations can be safely reordered. If the offsets and the SQUIDs are the same, then the operations are not reordered. No other mechanism is required to guarantee correctness of execution, and the probability of failing to reorder references to different objects is $2^{-n}$.

Improving Performance

The use of SQUIDs reduces the average overhead necessary to check for aliasing to a small but still non-zero amount. Ideally, pointers to objects which are never migrated should incur no overhead whatsoever.

Figure 6:
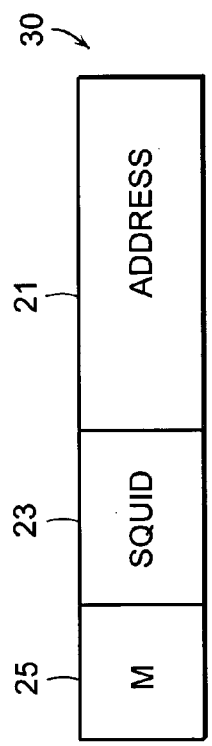
FIG. 6 is a schematic diagram illustrating an embodiment of the present invention that utilizes SQUIDs and a one-bit migration indicator.

As illustrated in FIG. 6, this can be achieved by adding a single 'migrated' bit (M) 25 to the pointer 30 to indicate whether or not the pointer points to the original address at which the object was allocated. When a new object is created, pointers to that object have M=0. When the object is migrated, pointers to the new location (and all subsequent locations) have M=1. If two pointers each with M=0 are being compared (either as the result of a user comparison instruction, or to determine whether or not memory operations can be reordered), the SQUIDs can be ignored and the comparison performed based on the addresses alone, and in fact, this migration bit 25 can be used without SQUIDs. Hence, there is no runtime cost associated with support for forwarding pointers until the software makes use of them.

Figure 7:
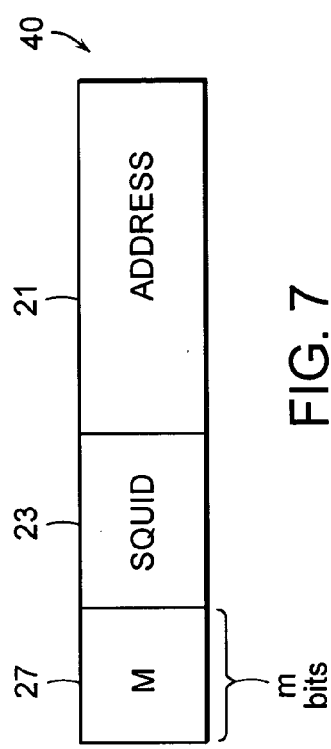
FIG. 7 is a schematic diagram illustrating an embodiment of the present invention that utilizes SQUIDs and a multiple-bit migration indicator.

As illustrated in FIG. 7, the migration indicator 27 can be expanded to multiple bits to indicate the migration generation, that is, the number of times the data has moved Pointers having migration indicators 27 that are equal (but not saturated—see below) can be compared without reference to the SQUIDs. When comparing two pointers having different values in their respective migration indicators, it is only necessary to dereference one of the pointers until the migration indicators match, at which point a valid address comparison can be performed. Of course, a pointer's migration indicator must saturate at some maximum value determined by its length, at which point it is not valid to use the migration indicator to compare pointers.

Hardware and Software Overhead

The only software overhead required to support SQUIDs is the code that generates them when objects are allocated. This adds just a few instructions to memory allocation. A trap handler is needed to check for aliasing when comparing different addresses with the same SQUID, but this code (or an equivalent hardware mechanism) is a general requirement for supporting forwarding pointers without UIDs and is not specific to the implementation of SQUIDs. Moreover, placing a single copy of this code in a trap handler creates much less software overhead than inlining the code at every pointer comparison as suggested by Luk.

In order to be effective, SQUIDs require only a small number of bits to be added to the pointer. For example, if eight bits are added (seven SQUID bits and one migrated bit), then the probability of failing to distinguish pointers to different objects is less than 0.008. The hardware required to implement SQUIDs consists of some simple logic to inspect SQUID/M bits for pointer comparisons and memory operation reordering, and support for a trap which occurs when different pointers with the same SQUIDs are compared.

SQUIDs can be applied to guarded pointers, which are described in U.S. Pat. No. 5,845,331 to Carter et al. (hereafter "Carter"), which is incorporated by reference herein in its entirety. Guarded pointers are a form of unforgeable capabilities, which include both a pointer and segment information within the guarded pointer itself. Guarded pointers are discussed in R. S. Fabry, "Capability-Based Addressing", Communications of the ACM, Volume 17, Number 7, pp. 403–412, July 1974, which is incorporated by reference herein in its entirety. The specific format of the guarded pointer is not important, but we assume that it is possible to determine the base address of an object given a pointer to the object's interior, as in Carter.

Figure 8:
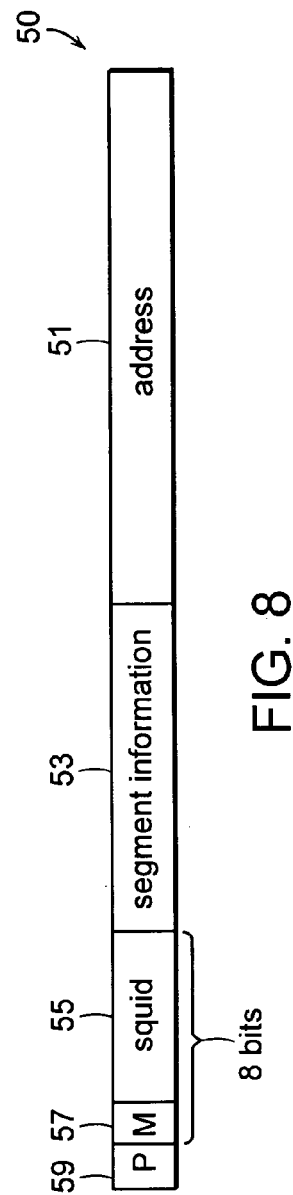
FIG. 8 is a schematic diagram illustrating an application of the present invention to guarded pointers.

FIG. 8 illustrates a guarded pointer embodiment of the present invention in which the guarded pointer 50 consists of an address 51, segment information 53, and a single pointer bit P 59 to distinguish guarded pointers from data. To support SQUIDs, a single migrated bit M 57 and a small number of SQUID bits (seven as shown) 55 are added.

Applications

Forwarding pointers are a key enabling mechanism for safe data compaction and efficient garbage collection. The present invention allows forwarding pointer support to be incorporated into novel architectures with little or no average run-time cost due to aliasing.

Luk made clear the advantages of data relocation in the context of a uniprocessor. By compacting live data, better use can be made of the cache and as a result program execution is sped up by as much as a factor of two. In a distributed shared memory multiprocessor it is also important to be able to relocate data for a different reason: a processor can access local memory an order of magnitude faster than it can access remote memory. Effective computation on such a machine therefore depends on being able to move data to the processing node at which it is needed. SQUIDs provide efficient support for data migration and are therefore applicable to both single processor and multiprocessor high performance systems.

Historically, one of the primary uses of forwarding pointers has been to implement incremental garbage collection. More recently, it is shown in Jeremy Brown, "Memory Management on a Massively Parallel Capability Architecture," Ph.D. thesis proposal, M.I.T., December 1999, incorporated by reference herein in its entirety, that forwarding pointers can be used to implement efficient local compacting garbage collection in a massively parallel distributed system. Hardware support for fast garbage collection is especially important given the growing prevalence of the Java programming environment, which is the language of choice for web programming and which specifies a garbage collected memory model. Another application of SQUIDs is therefore the implementation and/or improvement of systems which are specifically designed to run Java efficiently. Such systems are currently under development. For example, see Marc Tremblay, "An Architecture for the New Millenium", Proc. Hot Chips XI, Aug. 15–17, 1999, which is incorporated by reference herein in its entirety.

A SQUID need not necessarily be a part of the pointer itself. For example, Instead, a "SQUID cache" could be employed that stores SQUIDS of recently-used pointers. SQUIDS would then be retrieved by presenting the pointer address to the cache. While this might slow execution and require more complicated hardware, it might actually be a useful technique if the size of pointers is so severely constrained that there is absolutely no way to include the SQUID, for example, in a 32 bit machine in which all 32 bits are required for the pointer address.

While this invention has been particularly shown and described with references to preferred embodiments thereof, it will be understood by those skilled in the art that various changes in form and details may be made therein without departing from the scope of the invention encompassed by the appended claims.

What is claimed is:

1. A data processing system for processing programs, the system comprising:
    memory for storing data objects, the data objects being referenced by pointers;
    a short-quasi-unique-identifier (SQUID) generator which generates SQUIDs for newly allocated data objects to be stored in the memory segment, pointers to a particular data object being associated with the data object's SQUID; and
    a comparator which compares SQUIDs associated with two different pointers.

2. The system of claim 1, further comprising:
    a memory allocator which allocates a segment of the memory to a data object.

3. The system of claim 2, wherein if the data object is moved to a second allocated memory segment, a pointer to the second allocated memory segment is placed at the original memory segment.

4. The system of claim 3, wherein the data object is moved due to resizing.

5. The system of claim 3, wherein the data object is moved from a first memory to a second memory within a distributed system.

6. The system of claim 3, wherein the data object is moved due to garbage collection.

7. The system of claim 3, wherein the data object is moved due to data compaction.

8. The system of claim 1, wherein the distribution of SQUIDs over a range is uniform.

9. The system of claim 8, wherein SQUIDs are generated by counting.

10. The system of claim 8, wherein SQUIDs are generated randomly.

11. The system of claim 8, wherein SQUIDs are generated by hashing.

12. The system of claim 1, further comprising:
    an instruction reordering mechanism which reorders instructions and which is responsive to the comparator.

13. The system of claim 1, the comparator determining that the two pointers do not reference the same data object if the SQUIDs are different.

14. The system of claim 13, the comparator further determining that the two pointers reference the same data object if the SQUIDs are identical and address fields of the two pointers are identical.

15. The system of claim 14, each pointer address field comprising:
    a base address; and
    an offset,
    the comparator further determining the two pointers do not reference identical locations within a referenced data object if the pointers' offsets are not identical.

16. The system of claim 1, wherein a pointer is associated with a migration indicator field which indicates a number of migrations of the referenced data object by the time said pointer is created, the comparator determining that said two pointers do not reference the same data object if their associated migration indicators indicate identical numbers of migrations and their corresponding addresses are different.

17. The system of claim 16, wherein the migration indicator comprises one bit.

18. The system of claim 1, wherein at least one pointer is a guarded pointer.

19. The system of claim 1, wherein the SQUID is implemented by hardware.

20. The system of claim 1, wherein the SQUID is implemented by software.

21. The system of claim 1, wherein a pointer contains its associated SQUID.

22. The system of claim 1, further comprising a SQUID cache for storing SQUIDS of recently-used pointers.

23. A data processing system for processing programs, the system comprising:
    memory for storing data objects;
    pointers to data objects stored in the memory;
    migration indicators associated with pointers, a migration indicator indicating a number of migrations of a data object referenced by an associated pointer prior to said pointer being created; and
    a comparator which determines that said two pointers do not reference the same data object if their associated migration indicators indicate identical numbers of migrations and their corresponding addresses are different.

24. The system of claim 23, wherein the migration indicator comprises one bit.

25. The system of claim 23, wherein the migration indicator comprises multiple bits.

26. The system of claim 23, wherein the migration indicator is implemented by hardware.

27. The system of claim 23, wherein the migration indicator is implemented by software.

28. A method for processing programs, the system comprising:
    storing data objects in a memory, the data objects being referenced by pointers;
    generating a short-quasi-unique-identifier (SQUID) and assigning the SQUID to a data object stored in the memory segment, pointers to the data object being associated with the data object's assigned SQUID; and
    comparing SQUIDs of two different pointers.

29. The method of claim 28, further comprising:
    allocating a segment of the memory to the data object.

30. The method of claim 29, wherein if the data object is moved to a second allocated memory segment, a pointer to the second allocated memory segment is placed at the original memory segment.

31. The method of claim 30, wherein the data object is moved due to resizing.

32. The method of claim 30, wherein the data object is moved from a first memory to a second memory within a distributed system.

33. The method of claim 30, wherein the data object is moved due to garbage collection.

34. The method of claim 30, wherein the data object is moved due to data compaction.

35. The method of claim 28, wherein the distribution of SQUIDs over a range is uniform.

36. The method of claim 28, wherein SQUIDs are generated by counting.

37. The method of claim 28, wherein SQUIDs are generated randomly.

38. The method of claim 28, wherein SQUIDs are generated by hashing.

39. The method of claim 28, comparing SQUIDs of two different pointers further comprising:
    reordering instructions responsive to the comparison of SQUIDs.

40. The method of claim 28, comparing SQUIDs of two different pointers further comprising:
    determining that the two pointers do not reference the same data object if the SQUIDs are different.

41. The method of claim 28, comparing SQUIDs of two different pointers further comprising:
    determining that the two pointers reference the same data object if the SQUIDs are identical and address fields of the two pointers are identical.

42. The method of claim 28, comparing SQUIDs of two different pointers wherein each pointer address field comprises a base address and an offset, the method further comprising:
    determining the two pointers do not reference identical locations within a referenced data object if the pointers' offsets are not identical.

43. The method of claim 28, comparing SQUIDs of two different pointers wherein a pointer is associated with a migration indicator field which indicates a number of migrations of the referenced data object by the time said pointer is created, the method further comprising:
    determining that said two pointers do not reference the same data object if their associated migration indicators indicate identical numbers of migrations and their corresponding addresses are different.

44. The method of claim 43, wherein the migration indicator comprises one bit.

45. The method of claim 28, wherein at least one pointer is a guarded pointer.

46. The method of claim 28, wherein the SQUID is implemented by hardware.

47. The method of claim 28, wherein the SQUID is implemented by software.

48. The method of claim 28, wherein a pointer contains its associated SQUID.

49. The method of claim 28, further comprising:
    maintaining a SQUID cache for storing SQUIDS of recently-used pointers.

50. A method for processing programs, the method comprising:
    storing data objects in memory;
    generating pointers to the stored data objects;
    associating migration indicators with the pointers, a migration indicator indicating a number of migrations of a data object referenced by an associated pointer prior to said associated pointer being created; and
    comparing two pointers and determining that said two pointers do not reference the same data object if their associated migration indicators indicate identical numbers of migrations and their corresponding addresses are different.

51. The method of claim 50, wherein the migration indicator comprises one bit.

52. The method of claim 50, wherein the migration indicator comprises multiplebits.

53. The method of claim 50, wherein migration indicators are implemented by hardware.

54. The method of claim 50, wherein the migration indicators are implemented by software.

55. A data processing system for processing programs, the system comprising:
    means for storing data objects in a memory, the data objects being referenced by pointers;
    means for generating a short-quasi-unique-identifier (SQUID) and assigning the SQUID to a data object stored in the memory segment, pointers to the data object containing the data object's assigned SQUID; and means for comparing SQUIDs of two different pointers.

56. A data processing system for processing programs, the method comprising:

means for storing data objects in memory;

means for generating pointers to the stored data objects;

means for associating migration indicators with the pointers, a migration indicator indicating a number of migrations of a data object referenced by an associated pointer prior to said associated pointer being created; and means for comparing two pointers and determining that said two pointers do not reference the same data object if their associated migration indicators indicate identical numbers of migrations and their corresponding addresses are different.

57. A computer program product for processing programs, the computer program product comprising a computer usable medium having computer readable code thereon, including program code which:

stores data objects in a memory, the data objects being referenced by pointers;

generates a short-quasi-unique-identifier (SQUID) and assigns the SQUID to a data object stored in the memory segment, pointers to the data object containing the data object's assigned SQUID; and compares SQUIDs of two different pointers.

58. A computer data signal for processing programs, comprising:

a program code segment for storing data objects in a memory, the data objects being referenced by pointers;

a program code segment for generating a short-quasi-unique-identifier (SQUID) and assigning the SQUID to a data object stored in the memory segment, pointers to the data object containing the data object's assigned SQUID; and a program code segment for comparing SQUIDs of two different pointers.

59. A computer program product for processing programs, the computer program product comprising a computer usable medium having computer readable code thereon, including program code which:

stores data objects in memory;

generates pointers to the stored data objects;

associates migration indicators with the pointers, a migration indicator indicating a number of migrations of a data object referenced by an associated pointer prior to said associated pointer being created; and compares two pointers, detennining that said two pointers do not reference the same data object if their associated migration indicators indicate identical numbers of migrations and their corresponding addresses are different.

60. A computer data signal for processing programs, comprising:

a program code segment for storing data objects in memory;

a program code segment for generating pointers to the stored data objects;

a program code segment for associating migration indicators with the pointers, a migration indicator indicating a number of migrations of a data object referenced by an associated pointer prior to said associated pointer being created; and a program code segment for comparing two pointers, said segment determining that said two pointers do not reference the same data object if their associated migration indicators indicate identical numbers of migrations and their corresponding addresses are different.

* * * * *

UNITED STATES PATENT AND TRADEMARK OFFICE
CERTIFICATE OF CORRECTION

PATENT NO.        : 7,107,430 B2
APPLICATION NO.   : 09/990798
DATED             : September 12, 2006
INVENTOR(S)       : Jeffrey P. Grossman et al.

It is certified that error appears in the above-identified patent and that said Letters Patent is hereby corrected as shown below:

On the Title page, in item (75) Inventors, delete "Andrew W Huang" and insert --Andrew S. Huang--.

Column 10
Claim 52, line 56, delete "multiplebits" and insert --multiple bits--;

Column 12
Claim 59, line 14, delete "detennining" and insert --determining--.

Signed and Sealed this

Nineteenth Day of December, 2006

JON W. DUDAS
*Director of the United States Patent and Trademark Office*